United States Patent
Moore et al.

(10) Patent No.: US 9,870,718 B2
(45) Date of Patent: Jan. 16, 2018

(54) IMAGING DEVICES INCLUDING SPACING MEMBERS AND IMAGING DEVICES INCLUDING TACTILE FEEDBACK DEVICES

(71) Applicant: Toyota Motor Engineering & Manufacturing North America, Inc., Erlanger, KY (US)

(72) Inventors: Douglas A. Moore, Livermore, CA (US); Joseph M. A. Djugash, San Jose, CA (US); Yasuhiro Ota, Santa Clara, CA (US); Shin Sano, San Francisco, CA (US); Sarah Rosenbach, Berkeley, CA (US); Sho Hiruta, San Francisco, CA (US); Maura Hoven, San Francisco, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 503 days.

(21) Appl. No.: 14/567,036

(22) Filed: Dec. 11, 2014

(65) Prior Publication Data
US 2016/0171908 A1    Jun. 16, 2016

(51) Int. Cl.
G09B 19/16    (2006.01)
G09B 21/00    (2006.01)

(52) U.S. Cl.
CPC ......... *G09B 21/008* (2013.01); *G09B 21/007* (2013.01)

(58) Field of Classification Search
None
See application file for complete search history.

(56) References Cited

U.S. PATENT DOCUMENTS 5,543,972 A * 8/1996 Kamewada ......... E21B 47/0002
                                                    175/49
8,177,705 B2   5/2012 Abolfathi
(Continued)

FOREIGN PATENT DOCUMENTS

EP      1721237     8/2012
WO   2008008791    1/2008
WO   2010062481    6/2010

OTHER PUBLICATIONS

Voice Stick: Portable text scanning device for the visually impaired (http://www.tuvie.com/voice-stick-portable-text-scanning-device-for-the-visually-impaired/) (accessed Apr. 29, 2014).

(Continued)

*Primary Examiner* — Eileen Adams
(74) *Attorney, Agent, or Firm* — Dinsmore & Shohl LLP (57) ABSTRACT

Imaging devices including spacing members and imaging devices including tactile feedback devices are disclosed. An imaging device includes a body portion, a spacing member, and a camera. The body portion extends in a lengthwise direction from a distal end of the body portion to an imaging end of the body portion. The spacing member extends from the imaging end of the body portion in the lengthwise direction. The camera is coupled to the imaging end of the body portion. When the spacing member of the imaging device is positioned in contact with a surface to be imaged by the camera and the imaging device is moved across the surface, the spacing member maintains a fixed distance between the camera and the surface as the imaging device moves across the surface to be imaged. Imaging devices including tactile feedback devices that are activated when text is recognized are also disclosed.

20 Claims, 6 Drawing Sheets

(56) References Cited

U.S. PATENT DOCUMENTS

| | | | |
|---|---|---|---|
| 8,538,087 B2 | 9/2013 | Minoni et al. | |
| 2005/0022108 A1 | 1/2005 | Carro et al. | |
| 2008/0210474 A1* | 9/2008 | Lai | G06F 3/016 |
| | | | 178/18.03 |
| 2008/0248673 A1* | 10/2008 | Boehnlein | A61B 1/00052 |
| | | | 439/320 |
| 2008/0316178 A1* | 12/2008 | Caliksan | G06F 3/03547 |
| | | | 345/169 |
| 2009/0002345 A1 | 1/2009 | Burstrom et al. | |
| 2011/0221670 A1 | 9/2011 | King, III et al. | |
| 2012/0092161 A1 | 4/2012 | West | |
| 2014/0270528 A1* | 9/2014 | Ramos | G06T 5/001 |
| | | | 382/182 |
| 2015/0062024 A1* | 3/2015 | Kim | G06F 3/0488 |
| | | | 345/173 |

OTHER PUBLICATIONS

Assistive text reading from complex background for blind persons, Chucai Yi, (http://www-ee.ccny.cuny.edu/wwwn/yltian/Publications/CBDAR11-Yi-Tian.pdf) (accessed Apr. 29, 2014).

A pragmatic approach to aid visually impaired people in reading, visualizing and understanding textual contents with automatic electronic pen, Abstract, Kumar et al, 2011 IEEE International Conference on Computer Science and Automation Engineering (vol. 4), ISBN 978-1-4244-8727-1 (http://ieeexplore.ieee.org/xpl/login.jsp?tp=&arnumber=5952925&url=http%3A%2F%2Fieeexplore.ieee.org%2Fxpls%2Fabs_all.jsp%3Farnumber%3D5952925) (accessed Apr. 29, 2014).

OrCam—See for Yourself (http://www.orcam.com) (accessed Dec. 10, 2014).

GoPro Official Website: The World's Most Versatile Camera (http://gopro.com) (accessed Dec. 10, 2014).

* cited by examiner

IMAGING DEVICES INCLUDING SPACING MEMBERS AND IMAGING DEVICES INCLUDING TACTILE FEEDBACK DEVICES

TECHNICAL FIELD

The present specification generally relates to imaging devices and, more specifically, to imaging devices including spacing members and imaging devices including tactile feedback devices.

BACKGROUND

Visually impaired individuals may find it difficult to ascertain the content of printed text. Visually impaired individuals may utilize imaging devices to capture images of text. However, it may be difficult for such individuals to move such imaging devices to capture larger areas of text because the individuals may be unable to reliably and accurately image the areas due to unsteady movement of the imaging device relative to the areas to be imaged. It may also be difficult for such individuals to place such imaging devices over text fields to be imaged.

Accordingly, a need exists for imaging devices including spacer members and imaging devices including tactile feedback devices.

SUMMARY

In one embodiment, an imaging device includes a body portion, a spacing member, and a camera. The body portion extends in a lengthwise direction from a distal end of the body portion to an imaging end of the body portion. The spacing member extends from the imaging end of the body portion in the lengthwise direction. The camera is coupled to the imaging end of the body portion. When the spacing member of the imaging device is positioned in contact with a surface to be imaged by the camera and the imaging device is moved across the surface, the spacing member maintains a fixed distance between the camera and the surface as the imaging device moves across the surface to be imaged.

In another embodiment, an imaging device includes a body portion, a spacing member, and a camera. The body portion extends in a lengthwise direction from a distal end of the body portion to an imaging end of the body portion. The spacing member extends from the imaging end of the body portion in the lengthwise direction. The spacing member includes a body portion engagement end and a surface contact end. The body portion engagement end of the spacing member engages the imaging end of the body portion. The surface contact end of the spacing member is open. The camera is coupled to the imaging end of the body portion. When the spacing member is positioned in contact with a surface to be imaged by the camera and the imaging device is moved across the surface, the surface contact end contacts the surface and maintains a fixed distance between the camera and the surface as the imaging device moves across the surface to be imaged.

In yet another embodiment, an imaging device includes a body portion, a camera, a processor, a tactile feedback device, a memory module, and machine readable instructions. The camera is coupled to the body portion. The processor is communicatively coupled to the camera. The tactile feedback device is coupled to the body portion and communicatively coupled to the processor. The memory module is communicatively coupled to the processor. The machine readable instructions are stored in the memory module. When executed by the processor, the machine readable instructions cause the imaging device to receive image data from the camera, and activate the tactile feedback device when text is recognized in the image data.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 2:
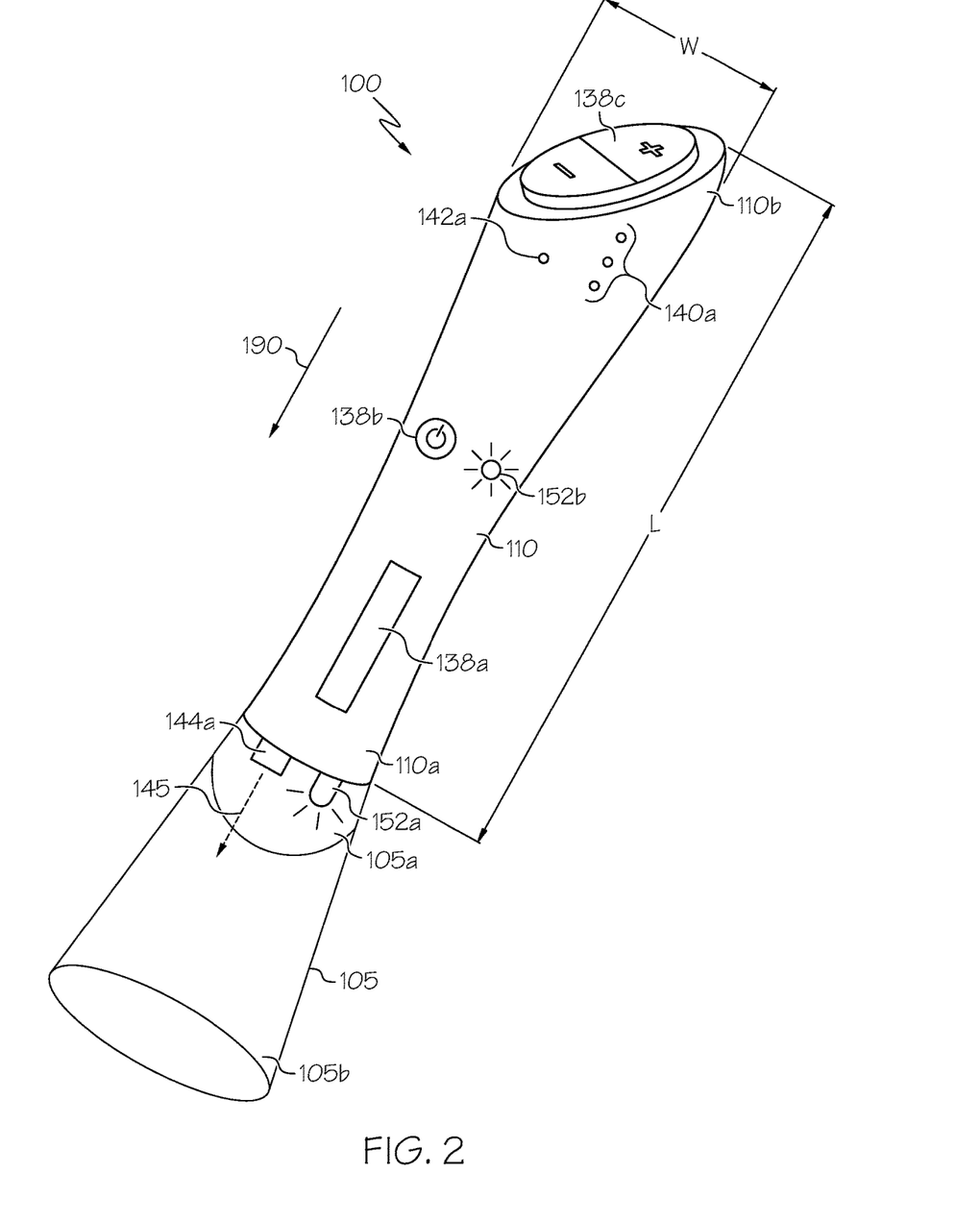
FIG. 2 schematically depicts a perspective view of an imaging device including a body portion, a camera, and a spacing member, according to one or more embodiments shown and described herein.

The embodiments disclosed herein include imaging devices including spacing members and imaging devices including tactile feedback devices. Referring generally to FIG. 2, an imaging device includes a body portion, a spacing member extending from the body portion, and a camera coupled to the imaging end of the body portion. When the spacing member of the imaging device is positioned in contact with a surface to be imaged by the camera and the imaging device is moved across the surface, the spacing member maintains a fixed distance between the camera and the surface as the imaging device moves across the surface to be imaged. Furthermore, referring generally to FIG. 4, an imaging device including a body portion, a camera, and a tactile feedback device coupled to the body portion activates the tactile feedback device when text is recognized in the received image data. The various imaging devices including spacing members and imaging devices including tactile feedback devices will be described in more detail herein with specific reference to the corresponding drawings.

Figure 1:
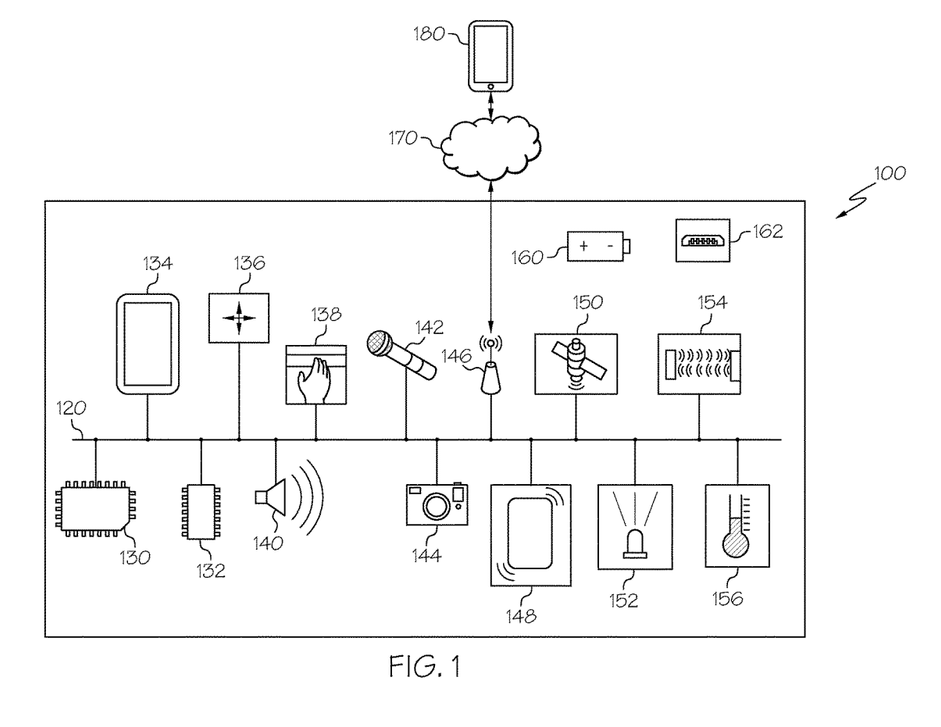
FIG. 1 schematically depicts an imaging device including a variety of sensors and electronic components, according to one or more embodiments shown and described herein.

Referring now to FIG. 1, one embodiment of an imaging device 100 is schematically depicted. The imaging device 100 includes a communication path 120, one or more processors 130, one or more memory modules 132, one or more displays 134, one or more inertial measurement units 136, tactile input hardware 138, one or more speakers 140, one or more microphones 142, one or more cameras 144, network interface hardware 146, one or more tactile feedback devices 148, one or more location sensors 150, one or more lights 152, one or more proximity sensors 154, one or more temperature sensors 156, one or more batteries 160, and one or more charging ports 162. The various components of the imaging device 100 and the interaction thereof will be described in detail below.

Still referring to FIG. 1, the communication path 120 may be formed from any medium that is capable of transmitting a signal such as, for example, conductive wires, conductive traces, optical waveguides, or the like. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the imaging device 100. As used herein, the term "communicatively coupled" means that coupled components are capable of exchanging data signals with one another such as, for example, electrical signals via conductive medium, electromagnetic signals via air, optical signals via optical waveguides, and the like.

Each of the one or more processors 130 of the imaging device 100 may be any device capable of executing machine readable instructions. Accordingly, each of the one or more processors 130 may be a controller, an integrated circuit, a microchip, a computer, or any other computing device. Each of the one or more processors 130 is communicatively coupled to the other components of the imaging device 100 by the communication path 120. Accordingly, the communication path 120 may communicatively couple any number of processors with one another, and allow the components coupled to the communication path 120 to operate in a distributed computing environment. Specifically, each of the components may operate as anode that may send and/or receive data.

Each of the one or more memory modules 132 of the imaging device 100 is coupled to the communication path 120 and communicatively coupled to the one or more processors 130. Each of the one or more memory modules 132 may comprise RAM, ROM, flash memories, hard drives, or any device capable of storing machine readable instructions such that the machine readable instructions can be accessed and executed by the one or more processors 130. The machine readable instructions may comprise logic or algorithm(s) written in any programming language of any generation (e.g., 1GL, 2GL, 3GL, 4GL, or 5GL) such as, for example, machine language that may be directly executed by the one or more processors 130, or assembly language, object-oriented programming (OOP), scripting languages, microcode, etc., that may be compiled or assembled into machine readable instructions and stored in the one or more memory modules 132. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Each of the one or more displays 134 is coupled to the communication path 120 and communicatively coupled to the one or more processors 130. Each of the one or more displays 134 may be any device capable of providing visual output. Each of the one or more displays 134 may include any medium capable of transmitting an optical output such as, for example, a cathode ray tube, light emitting diodes, a liquid crystal display, a plasma display, or the like. In some embodiments, the one or more displays 134 may include a touchscreen that, in addition to providing optical information, detects the presence and location of a tactile input upon a surface of or adjacent to the display. In such embodiments, the touchscreen may receive mechanical input directly upon the optical output provided by the display. In some embodiments, the one or more displays 134 includes a three dimensional tactile display including a surface, portions of which may raise to communicate information. Additionally, it is noted that each of the one or more displays 134 can include at least one processor or memory module. Some embodiments of the imaging device 100 may not include the one or more displays 134.

Each of the one or more inertial measurement units 136 is coupled to the communication path 120 and communicatively coupled to the one or more processors 130. Each of the one or more inertial measurement units 136 may include one or more accelerometers and one or more gyroscopes. Each of the one or more inertial measurement units 136 transforms sensed physical movement of the imaging device 100 into a signal indicative of an orientation, a rotation, a velocity, or an acceleration of the imaging device 100. Some embodiments of the imaging device 100 may not include the one or more inertial measurement units 136, such as embodiments that include an accelerometer but not a gyroscope, embodiments that include a gyroscope but not an accelerometer, or embodiments that include neither an accelerometer nor a gyroscope.

Still referring to FIG. 1, the tactile input hardware 138 is coupled to the communication path 120 and communicatively coupled to the one or more processors 130. The tactile input hardware 138 may be any device capable of transforming mechanical pressure (e.g., the pressure from a user contacting the tactile input hardware 138) into a data signal that can be transmitted over the communication path 120 such as, for example, a button, a switch, a knob, a microphone or the like. In some embodiments, the tactile input hardware 138 includes a power button, a volume button, an activation button, a scroll button, or the like. In some embodiments, the tactile input hardware 138 includes a pressure sensor, a touch strip, a pressure strip, or the like. Some embodiments may not include the tactile input hardware 138.

Each of the one or more speakers 140 is coupled to the communication path 120 and communicatively coupled to the one or more processors 130. Each of the one or more speakers 140 transforms data signals from the imaging device 100 into audible mechanical vibrations. However, it should be understood that in other embodiments the imaging device 100 may not include the one or more speakers 140.

Each of the one or more microphones 142 is coupled to the communication path 120 and communicatively coupled to the one or more processors 130. Each of the one or more microphones 142 may be any device capable of transforming a mechanical vibration associated with sound into an electrical signal indicative of the sound. Some embodiments may not include the one or more microphones 142.

Each of the one or more cameras 144 is coupled to the communication path 120 and communicatively coupled to the one or more processors 130. Each of the one or more cameras 144 may be any device having an array of sensing devices (e.g., pixels) capable of detecting radiation in an ultraviolet wavelength band, a visible light wavelength band, or an infrared wavelength band. Each of the one or more cameras 144 may have any resolution. The one or more cameras 144 may include an omni-directional camera, or a panoramic camera. In some embodiments, one or more optical components, such as a minor, fish-eye lens, or any other type of lens may be optically coupled to at least one of the one or more cameras 144.

The network interface hardware 146 is coupled to the communication path 120 and communicatively coupled to the one or more processors 130. The network interface hardware 146 may be any device capable of transmitting and/or receiving data via a network 170. Accordingly, the network interface hardware 146 can include a communication transceiver for sending and/or receiving any wired or wireless communication. For example, the network interface hardware 146 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the network interface hardware 146 includes hardware configured to operate in accordance with the Bluetooth wireless communication protocol. In some embodiments, the network interface hardware 146 may include a Bluetooth send/receive module for sending and receiving Bluetooth communications to/from a portable electronic device 180.

Still referring to FIG. 1, in some embodiments, the imaging device 100 may be communicatively coupled to a portable electronic device 180 via the network 170. In some embodiments, the network 170 is a personal area network that utilizes Bluetooth technology to communicatively couple the imaging device 100 and the portable electronic device 180. In other embodiments, the network 170 may include one or more computer networks (e.g., a personal area network, a local area network, or a wide area network), cellular networks, satellite networks and/or a global positioning system and combinations thereof. Accordingly, the imaging device 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As stated above, the network 170 may be utilized to communicatively couple the imaging device 100 with the portable electronic device 180. The portable electronic device 180 may include a mobile phone, a smartphone, a personal digital assistant, a camera, a dedicated mobile media player, a mobile personal computer, a laptop computer, and/or any other portable electronic device capable of being communicatively coupled with the imaging device 100. The portable electronic device 180 may include one or more processors and one or more memories. The one or more processors can execute logic to communicate with the imaging device 100. The portable electronic device 180 may be configured with wired and/or wireless communication functionality for communicating with the imaging device 100. In some embodiments, the portable electronic device 180 may perform one or more elements of the functionality described herein, such as in embodiments in which the functionality described herein is distributed between the imaging device 100 and the portable electronic device 180.

Still referring to FIG. 1, each of the one or more tactile feedback devices 148 is coupled to the communication path 120 and communicatively coupled to the one or more processors 130. Each of the one or more tactile feedback devices 148 may be any device capable of providing tactile feedback to a user. The one or more tactile feedback devices 148 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). Some embodiments may not include the one or more tactile feedback devices 148.

Each of the one or more location sensors 150 is coupled to the communication path 120 and communicatively coupled to the one or more processors 130. Each of the one or more location sensors 150 may be any device capable of generating an output indicative of a location. In some embodiments, the one or more location sensors 150 include a global positioning system (GPS) sensor, though embodiments are not limited thereto. Some embodiments may not include the one or more location sensors 150, such as embodiments in which the imaging device 100 does not determine a location of the imaging device 100 or embodiments in which the location is determined in other ways (e.g., based on information received from the one or more cameras 144, the one or more microphones 142, the network interface hardware 146, the one or more proximity sensors 154, the one or more inertial measurement units 136 or the like).

Each of the one or more lights 152 is coupled to the communication path 120 and communicatively coupled to the one or more processors 130. Each of the one or more lights 152 may be any device capable of outputting light, such as but not limited to a light emitting diode, an incandescent light, a fluorescent light, or the like. In some embodiments, the one or more lights 152 include a power indicator light that is illuminated when the imaging device 100 is powered on. In some embodiments, the one or more lights 152 includes an activity indicator light that is illuminated when the imaging device 100 is active or processing data. In some embodiments, the one or more lights 152 includes an illumination light for illuminating a field proximate the imaging device 100. Some embodiments may not include the one or more lights 152, such as embodiments in which visual output is provided via the one or more displays 134, or embodiments in which no light output is provided.

Each of the one or more proximity sensors 154 is coupled to the communication path 120 and communicatively coupled to the one or more processors 130. Each of the one or more proximity sensors 154 may be any device capable of outputting a proximity signal indicative of a proximity of the imaging device 100 to another object. In some embodiments, the one or more proximity sensors 154 may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the one or more proximity sensors 154, such as embodiments in which the proximity of the imaging device 100 to an object is determine from inputs provided by other sensors (e.g., the one or more cameras 144, the one or more speakers 140, etc.) or embodiments that do not determine a proximity of the imaging device 100 to an object.

Each of the one or more temperature sensors 156 is coupled to the communication path 120 and communicatively coupled to the one or more processors 130. Each of the one or more temperature sensors 156 may be any device capable of outputting a temperature signal indicative of a temperature sensed by the one or more temperature sensors 156. In some embodiments, the one or more temperature sensors 156 may include a thermocouple, a resistive temperature device, an infrared sensor, a bimetallic device, a change of state sensor, a thermometer, a silicon diode sensor, or the like. Some embodiments of the imaging device 100 may not include the one or more temperature sensors 156.

The imaging device 100 is powered by the one or more batteries 160, each of which is electrically coupled to the various electrical components of the imaging device 100. Each of the one or more batteries 160 may be any device capable of storing electric energy for later use by the imaging device 100. In some embodiments, the one or more batteries 160 may include a rechargeable battery, such as a lithium-ion battery or a nickel-cadmium battery. In embodiments in which the one or more batteries 160 include a rechargeable battery, the imaging device 100 may include the one or more charging ports 162, each of which may be used to charge the one or more batteries 160. Some embodiments may not include the one or more batteries 160, such as embodiments in which the imaging device 100 is powered by solar energy or energy harvested from the environment. Some embodiments may not include the one or more charging ports 162, such as embodiments in which the imaging device utilizes disposable batteries for power.

Referring now to FIG. 2, a perspective view of the imaging device 100 is schematically depicted. The imaging device 100 includes a body portion 110, a spacing member 105, a camera 144a, an illumination light 152a, a power indicator light 152b, a touch strip 138a, a power button 138b, a volume button 138c, a microphone 142a, and a speaker 140a. The body portion 110 extends in a lengthwise direction 190 from a distal end 110b to an imaging end 110a. In some embodiments, the body portion 110 is a cylindrical body portion having a maximum diameter of less than three inches. As used herein, the term "cylindrical body portion" means a body portion having a generally cylindrical shape such that each cross section of the body portion along the lengthwise direction is elliptical. In some embodiments, the body portion 110 is not cylindrically shaped, such as embodiments in which the body portion 110 has a prism shape, a cuboid shape, or the like. In some embodiments, the body portion 110 is pen-shaped such that a length L of the body portion is at least three times greater than a maximum cross-sectional width W of the body portion 110. A pen-shaped body portion 110 may have a familiar form that avoids drawing attention to the user of the imaging device 100 from the public.

Still referring to FIG. 2, the camera 144a is disposed within an interior of the spacing member 105. However, in other embodiments, the camera 144a may not be disposed within an interior of the spacing member 105, such as embodiments in which the camera 144a is recessed within the body portion 110. The camera 144a depicted in FIG. 2 has an optical axis 145 that extends in the lengthwise direction 190, though embodiments are not limited thereto. The camera 144a is included in the one or more cameras 144 described above with respect to FIG. 1. While the embodiment depicted in FIG. 2 includes only one camera 144a, other embodiments may include more than one camera, such as embodiments that include two cameras that provide a stereoscopic viewing system.

Still referring to FIG. 2, the spacing member 105 extends from the imaging end 110a. In some embodiments, the spacing member 105 is a component separate from the body portion 110. In other embodiments, the spacing member 105 and the body portion 110 are integrally formed. In the embodiment depicted in FIG. 2, the spacing member 105 extends from the imaging end 110a in the lengthwise direction 190. In other embodiments the spacing member 105 may extend from the imaging end 110a at an angle relative to the lengthwise direction 190, such as when the spacing member 105 extends from the body portion 110 at an angle relative to the body portion 110. In some embodiments, the angle of the spacing member 105 relative to the body portion 110 may be adjustable. In some embodiments the spacing member 105 is transparent or translucent, though the spacing member 105 may be opaque in other embodiments. The spacing member 105 depicted in FIG. 2 is a hollow truncated cone. In some embodiments, the spacing member 105 may have a shape other than a hollow truncated cone, such as embodiments in which the spacing member 105 has a cylindrical shape, a prism shape, a cuboid shape, or the like.

Still referring to FIG. 2, the spacing member 105 includes a body portion engagement end 105a and a surface contact end 105b. The body portion engagement end 105a engages the imaging end 110a of the body portion 110. When the spacing member 105 is positioned in contact with a surface to be imaged, as will be described below with reference to FIGS. 3-4, the surface contact end 105b contacts the surface. In the embodiment depicted in FIG. 2, the surface contact end 105b is open such that the spacing member 105 does not obstruct the camera 144a when the camera 144a images a surface. However, in some embodiments the surface contact end 105b may not be open, such as in embodiments in which the surface contact end 105b is a transparent or translucent planar surface, such as plastic, glass, or the like.

As will be described in detail below, when the spacing member 105 of the imaging device 100 is positioned in contact with a surface to be imaged by the camera 144a and the imaging device 100 is moved across the surface, the spacing member 105 maintains a fixed distance between the camera 144a and the surface as the imaging device 100 moves across the surface. By maintaining a fixed distance between the camera 144a and the imaged surface, text and images may be reliably and accurately captured. Some embodiments may not include the spacing member 105, such as embodiments in which it is not desired for the imaging device 100 to be placed in contact with a surface to be imaged by the imaging device 100. In some embodiments, spacing members of varying lengths are provided for use with the imaging device 100, such as in embodiments in which a longer spacing member is provided for imaging larger areas (e.g., entire documents) and a shorter spacing member is provided for imaging smaller areas (e.g., lines, paragraphs, or portions of documents).

Still referring to FIG. 2, the illumination light 152a is coupled to the body portion 110. The illumination light 152a may output light for illuminating a surface or environment to be imaged by the one or more cameras 144. Accordingly, in some embodiments, the illumination light 152a may output light in the direction of the optical axis 145 of the camera 144a. The power indicator light 152b may be illuminated when the imaging device 100 is powered on to provide a visual indication that the imaging device 100 is powered on. The illumination light 152a and the power indicator light 152b are included in the one or more lights 152 described above with respect to FIG. 1. Some embodiments may not include one or both of the illumination light 152a and the power indicator light 152b.

Still referring to FIG. 2, the touch strip 138a, the power button 138b, and the volume button 138c are coupled to and disposed on the body portion 110. The touch strip 138a transforms mechanical pressure from a user contacting the touch strip 138a into a data signal indicative of a user applying pressure to the touch strip 138a. The touch strip 138a may be manipulated by a user for a variety of purposes, such as to activate or deactivate the imaging device 100. When the touch strip 138a is used to activate the imaging device 100, the imaging device 100 may receive a signal from the touch strip 138a indicative of a user applying pressure to the touch strip, and provide output indicative of text or an object recognized by the imaging device 100 in response to the received signal. Similarly, the touch strip 138a may be used to deactivate the imaging device 100 by ceasing to provide output indicative of text or object recognition in response to receiving a signal from the touch strip 138a. Further details regarding text or object recognition will be provided below. Some embodiments include opposing touch strips on opposite sides of the body portion 110, such that a user may apply pressure to the opposing touch strips when gripping the body portion 110 at the location of the touch strips. The power button 138b may transform mechanical pressure from a user pressing the button into a signal indicative of the pressing of the power button 138b. The imaging device 100 may power on or power off in response to receiving the signal indicative of the pressing of the power button 138b. The volume button 138c may transform mechanical pressure from a user pressing the button into a signal indicative of the pressing of the volume button 138c. The imaging device 100 may adjust the volume of audible output provided by the speaker 140a in response to receiving the signal indicative of the pressing of the volume button 138c. The touch strip 138a, the power button 138b, and the volume button 138c are included in the tactile input hardware 138 described above with respect to FIG. 1. Some embodiments may not include one or more of the touch strip 138a, the power button 138b, and the volume button 138c.

Still referring to FIG. 2, the microphone 142a is coupled to the body portion 110. The microphone 142a transforms mechanical vibration associated with sound into an electrical signal indicative of the sound. In some embodiments, the microphone 142a may be used by a user to interact with the imaging device 100, such as in embodiments in which a user may issue verbal commands to the imaging device 100 to control the device. The microphone 142a is included in the one or more microphones 142 described above with respect to FIG. 1.

Still referring to FIG. 2, the speaker 140a is coupled to the body portion 110. The speaker 140a transforms data signals from the imaging device 100 into audible output, such as audible output indicative of text or objects recognized by the imaging device 100. The speaker 140a is included in the one or more speakers 140 described above with respect to FIG. 1.

It should be understood that in other embodiments, the imaging device 100 depicted in FIG. 2 may have a different configuration or layout of components. In some embodiments, the imaging device 100 may not include at least one of the depicted components. In some embodiments, the imaging device 100 may include other components than depicted in FIG. 2, such as embodiments that include other components described above with respect to FIG. 1, such as the one or more displays 134, the one or more temperature sensors 156, the one or more proximity sensors 154, or the like that are disposed on the body portion 110. Additionally, it should be understood that in other embodiments the depicted imaging device 100 may include one or more components coupled to and housed within the body portion 110, such as embodiments in which the one or more processors 130, the one or more memory modules 132, the one or more inertial measurement units 136, the network interface hardware 146, the one or more location sensors 150, the one or more tactile feedback devices 148, the one or more temperature sensors 156, or the like are housed within the body portion 110.

By way of non-limiting examples, the imaging device 100 may be used to recognize text or objects in a user's environment and provide output (e.g., audible output provided by the speaker 140a, output transmitted to a paired portable electronic device, etc.) in response to recognizing the text or objects. A user may utilize the imaging device 100 to take a picture of a field of view of the camera 144a, which may include text or an environment including one or more objects. With respect to objects in the user's environment, the user may utilize the imaging device 100 to recognize a variety of classes of objects including, but not limited to, people, tables, empty seats, doorways, walls, restrooms, and water fountains.

For example, the user may activate the imaging device 100 to take a picture of the field of view imaged by the camera 144a by applying pressure to the touch strip 138a, by pressing the power button 138b, or by moving the imaging device 100 in a manner that causes the one or more inertial measurement units 136 to generate a signal that causes the imaging device 100 to receive image data from the camera 144a. The image data may be received by the one or more processors 130, which may process the image data using one or more algorithms. Any known or yet-to-be developed optical character recognition algorithms may be applied to the image data in order to recognize text included in the image data. One or more object recognition algorithms may be applied to the image data to extract objects having the particular class selected by the user. Any known or yet-to-be-developed object recognition algorithms may be used to extract the objects from the image data. Example object recognition algorithms include, but are not limited to, scale-invariant feature transform ("SIFT"), speeded up robust features ("SURF"), and edge-detection algorithms. Any known or yet-to-be developed facial recognition algorithms may also be applied to the image data to detect particular people within the environment. The optical character recognition algorithms, object recognition algorithms, or facial recognition algorithms may be stored in the one or more memory modules 132 and executed by the one or more processors 130.

By way of non-limiting example, a visually impaired user may utilize the imaging device 100 to read aloud text imaged from a surface. A visually impaired user may also utilize the imaging device 100 to provide output pertaining to objects recognized by the imaging device 100 or an environment imaged by the imaging device 100. However, uses of the imaging device 100 are not limited to applications for visually impaired individuals. For example, the imaging device 100 may be used by a user having normal vision to translate imaged text that is in a language other than the user can comprehend by: imaging the text, and providing an audible translation of the text in a language that the user can comprehend. A non-limiting example use case of a visually impaired user using the imaging device 100 to identify the sender of a piece of mail will now be described with reference to FIGS. 3-6.

Figure 3:
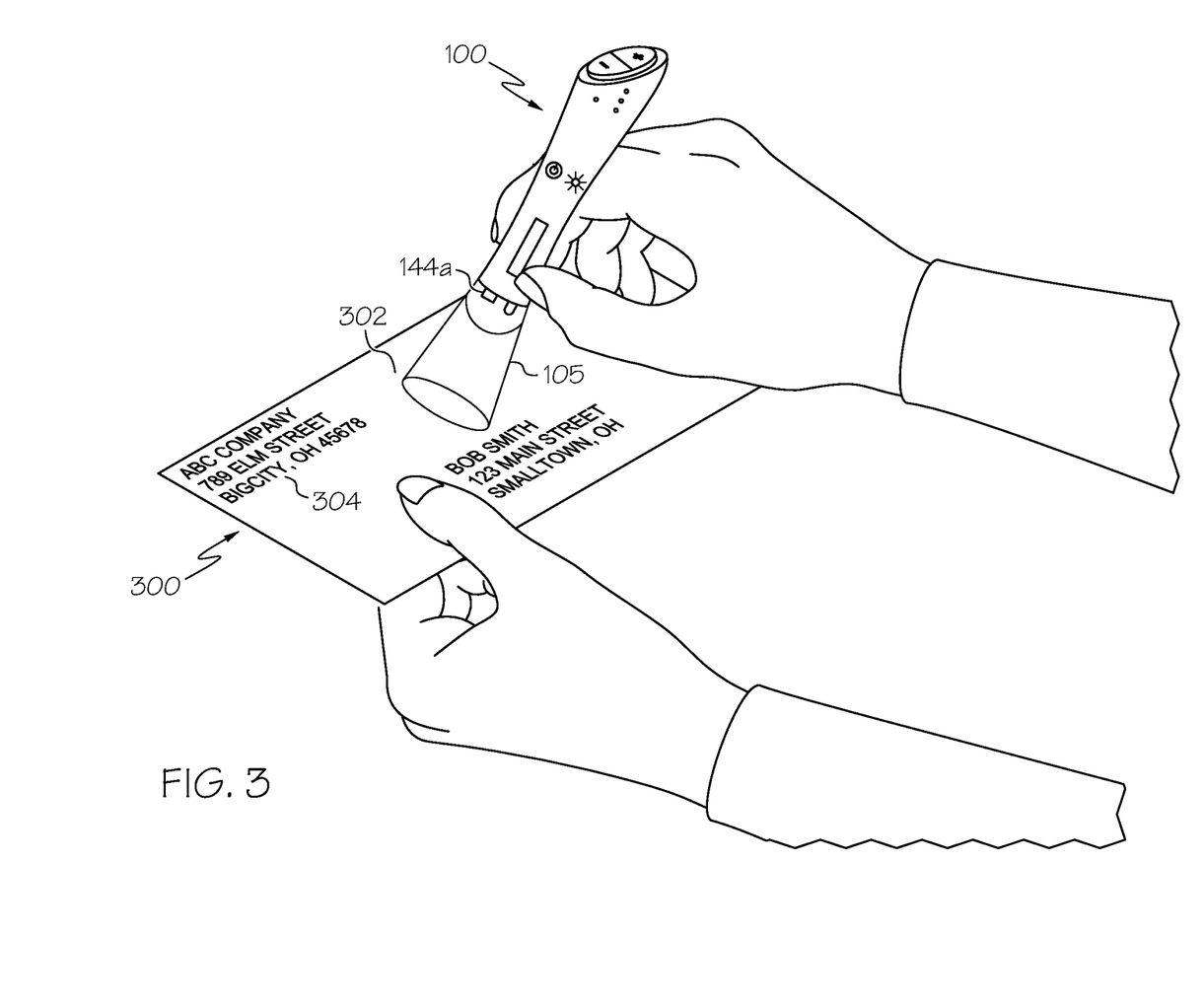
FIG. 3 schematically depicts an imaging device imaging a portion of a surface of an envelope that does not contain text, according to one or more embodiments shown and described herein.

Referring now to FIG. 3, when a user receives an envelope 300 in the mail, the user may wish to identify the sender of an envelope 300. The user may position the imaging device 100 on a surface of the envelope 300 such that the spacing member 105 is in contact with the surface. As noted above, when the spacing member 105 is positioned in contact with the surface of the envelope 300 and the imaging device 100 is moved across the surface, the spacing member 105 maintains a fixed distance between the camera 144a and the surface as the imaging device 100 moves across the surface to be imaged. Maintaining a fixed distance between the camera 144a and the surface to be imaged may facilitate accurate and efficient imaging of the surface. This feature of the spacing member 105 may be particularly beneficial to visually impaired users who may have a difficult time maintaining a fixed distance between the camera 144a and the surface as the imaging device 100 is moved relative to the surface to be imaged.

From the initial configuration depicted in FIG. 3, the user may then move the imaging device 100 across the surface of the envelope 300 to identify text, images, or other information printed on the surface. For example, the user may wish to image the surface of the envelope 300 in order to determine the sender of the envelope 300. Not being able to see what is printed on the surface of the envelope 300, the user may start by imaging a portion 302 of the envelope 300 that does not include text, as depicted in FIG. 3. The imaging device 100 may receive image data from the camera 144a and determine that text is not present (e.g., by processing received image data with one or more optical character recognition programs executed by the one or more processors 130). The imaging device 100 may provide output to the user indicating that text is not present in the imaged field, such as by providing an audible indication through the speaker 140a or activating the one or more tactile feedback devices 148 (FIG. 1).

Figure 4:
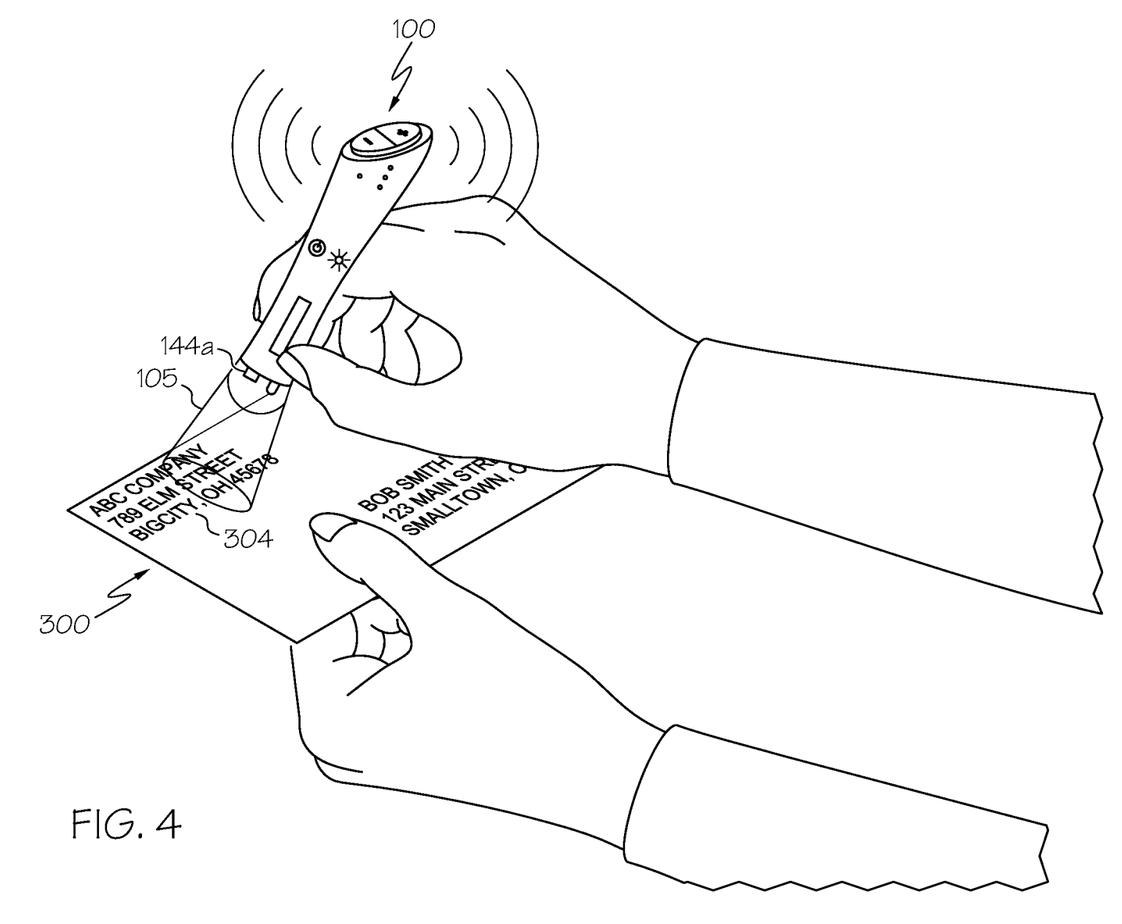
FIG. 4, schematically depicts an imaging device imaging a portion of a surface of an envelope that contains text, according to one or more embodiments shown and described herein.
Figure 5:
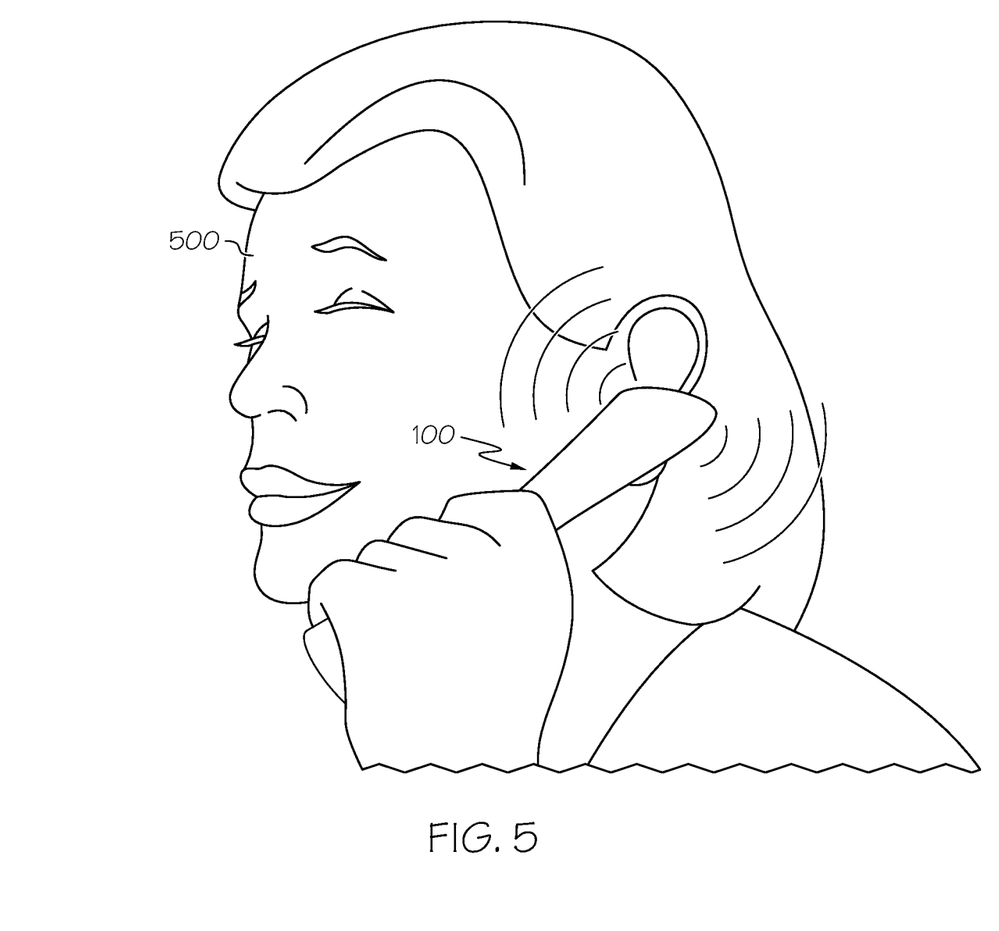
FIG. 5 schematically depicts an imaging device providing audible output to a user, according to one or more embodiments shown and described herein.
Figure 6:
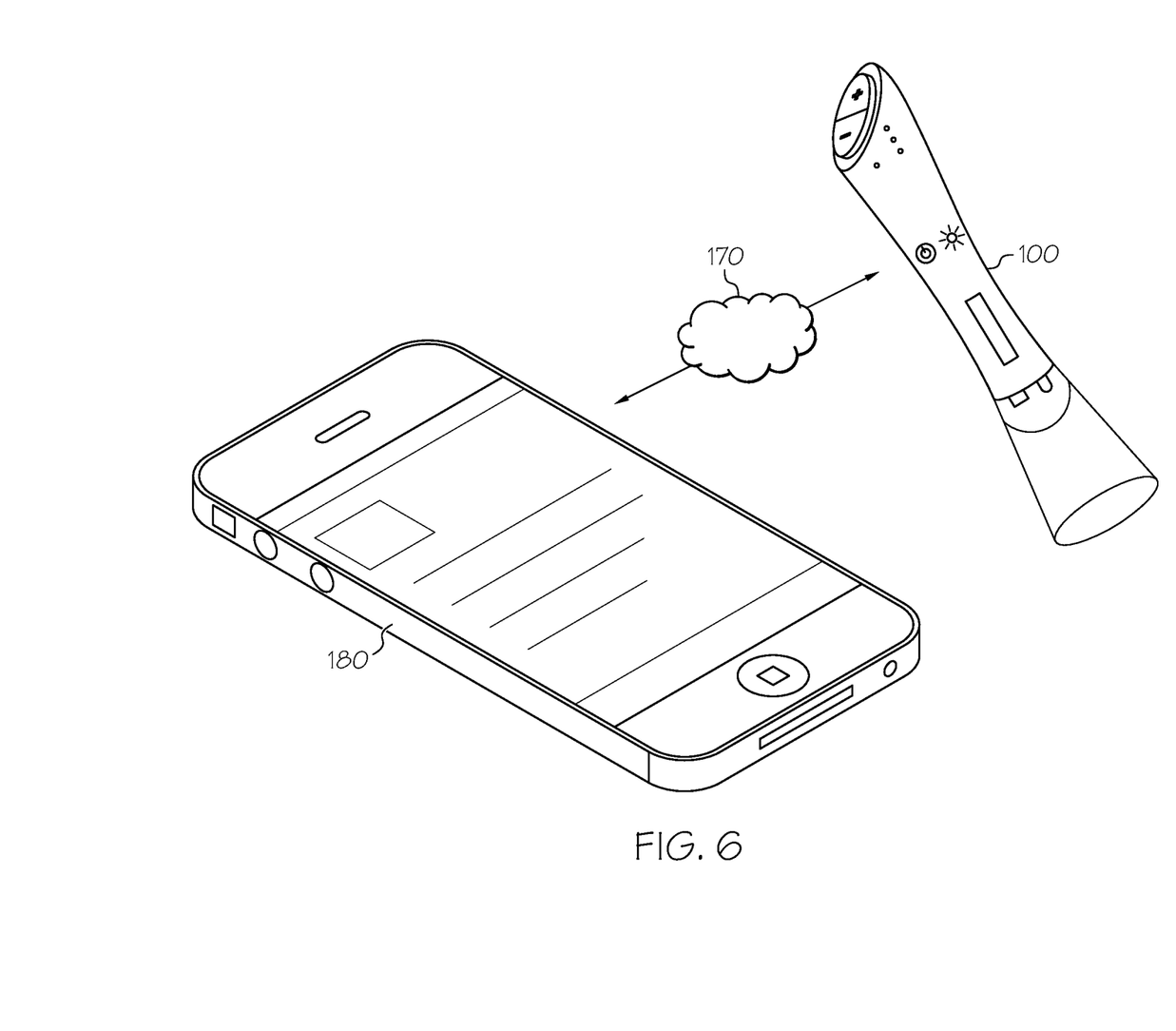
FIG. 6 schematically depicts an imaging device transmitting information to a portable electronic device, according to one or more embodiments shown and described herein.

In some embodiments, the imaging device 100 may receive image data from the camera 144a and activate a tactile feedback device in response to the received image data, such as to aid in the positioning of the imaging device 100 over a text field. In some embodiments, in order to facilitate the positioning of the imaging device 100 over a portion of the surface that includes text, the imaging device 100 may receive image data, determine that text is included in the image data, and activate the one or more tactile feedback devices 148 (FIG. 1) in response to determining that text is included in the image data. For example, when the user moves the imaging device 100 over the return address portion 304, as shown in FIG. 4, the imaging device 100 may determine that text is included in image data received from the camera 144a and activate the one or more tactile feedback devices 148 to signal to the user that the user has now positioned the imaging device 100 over the text. In some embodiments, the one or more tactile feedback devices 148 are activated in other circumstances, such as by activating the one or more tactile feedback devices 148 when the user fails to follow a line or portion of text, or activating the one or more tactile feedback devices 148 with greater intensity as a deviation from a desired path for reading a line or portion of text increases as the user moves the imaging device 100 across a surface.

Once the imaging device 100 is placed over a portion of the surface that includes text, such as when the imaging device 100 is placed over and images the return address portion 304 of the envelope 300 (FIG. 4), the imaging device 100 may process the image data received from the camera 144a to recognized text included in the received image data with one or more of optical character recognition algorithms executed by the one or more processors 130.

After receiving image data and recognizing text in the received image data, as described above with reference to FIGS. 3 and 4, the imaging device 100 may provide output indicative of the recognized text. In some embodiments, the imaging device 100 may provide audible output indicative of the recognized text, such as by outputting "the mail is from ABC Company," (FIG. 5) via the speaker 140a of the imaging device 100 to indicate to the visually impaired user that the mail in his or her hand is from ABC Company. In some embodiments, the imaging device 100 may transmit the output indicative of the recognized text to a portable electronic device. For example, in the embodiment depicted in FIG. 6, the imaging device 100 may transmit the text recognized from the imaged surface of the envelope 300 to the portable electronic device 180 via the network 170. The portable electronic device 180 may utilize the transmitted text for a variety of purposes, such as for updating a database of incoming mail, performing an automated action in response to receiving such information, or storing such information for later retrieval or use by the user. In some embodiments, the imaging device 100 may transmit a message to a headset paired to the imaging device 100 via the network interface hardware 146 that causes the headset to generate audible output, such as the "the mail is from ABC Company" message described above. In some embodiments, the functionality described herein, such as the text recognition and image processing features may distributed among the imaging device 100 and the portable electronic device 180.

While the imaging device 100 was described in the context of text recognition in FIGS. 3-6, embodiments are not limited thereto. For example, the imaging device 100 may be used to recognize objects in a user's environment or to provide output pertaining to the environment. In such embodiments, the imaging device 100 may receive image data from the camera 144a, recognize an object included in the received image data, and provide output indicative of the recognized object. The output may include spatial information regarding objects that are in the user's environment as extracted from the image data. The output may indicate the presence and position of particular objects, such as empty seats, doorways, tables, people, and the like. By way of non-limiting example, the output may include the number of empty seats in the room, the presence of a particular person in a room, or the like. In some embodiments, the optical character recognition algorithms may be used to detect text on signs or other objects in a user's environment. By way of non-limiting example, image data of a user's environment captured by the camera may include an "EXIT" sign. The one or more processors 130 may detect and extract the word and location of the "EXIT" sign in the environment and provide audible output that the exit sign was detected.

Referring once again to FIG. 1, some embodiments that include the one or more inertial measurement units 136 may detect an orientation of the imaging device 100 with the one or more inertial measurement units 136, and determine an operating mode for the imaging device 100 based on the detected orientation. For example, when an orientation in which the imaging device 100 is generally upright or the camera 144a is directed generally downward is detected, the operational mode may be determined as a text recognition mode, such as described above with respect to FIGS. 3-6. When an orientation in which the imaging device 100 is generally horizontal or the camera 144a is directed horizontally or upward is detected, the operational mode may be determined to be an objection recognition mode or an environmental awareness mode in which the imaging device 100 recognizes objects imaged by the camera 144a, recognizes features of an environment imaged by the camera 144a, and/or provides output based on the recognized objects or recognized environmental features. The one or more inertial measurement units 136 may also be used for gesture-based control of the imaging device 100, such as by activating or deactivating the imaging device 100 in response to input received from the one or more inertial measurement units 136, or changing the functionality of the imaging device 100 in response to input received from the one or more inertial measurement units 136.

Still referring to FIG. 1, in some embodiments, the imaging device 100 may also provide navigational assistance to a user. For example, the imaging device 100 may determine a location of the user in an environment (e.g., based on information received from the one or more location sensors 150, image data received from the one or more cameras 144, or the like), and generate a path for a user to traverse. In some embodiments, the imaging device 100 may access map data (e.g., data relating to external maps, such as roads, footpaths, buildings, or the like) stored in the one or more memory modules 132 in order to generate the path. The imaging device 100 may then provide audible output via the one or more speakers 140 and/or the one or more tactile feedback devices 148 to guide the user along the determined path. For example, the imaging device 100 may provide audible output with respect to upcoming turns, distance to travel in a forward direction before the next turn, obstacles, hazards, landmarks, or the like.

It should be understood that embodiments described herein are directed to imaging devices including spacing members and imaging devices including tactile feedback devices. When the spacing member of the imaging device is positioned in contact with a surface to be imaged by the camera and the imaging device is moved across the surface, the spacing member maintains a fixed distance between the camera and the surface as the imaging device moves across the surface. By maintaining a fixed distance between the camera and the imaged surface, text and images may be reliably and accurately captured. Furthermore, imaging devices including tactile feedback devices that are activated when text is recognized in an imaged field of view may allow a user to position the imaging device over a text field. Such imaging devices may be useful to visually impaired individuals who may have difficulty maintaining a fixed distance between a camera and a surface to be imaged, or who may have difficulty placing the imaging device over a text field. Moreover, the imaging devices described herein may also be portable and lightweight, allowing for frequent and non-taxing use by a visually impaired individual.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An imaging device comprising:
   a body portion extending in a lengthwise direction from a distal end of the body portion to an imaging end of the body portion;
   a spacing member extending from the imaging end of the body portion in the lengthwise direction; and
   a camera coupled to the imaging end of the body portion, wherein when the spacing member of the imaging device is positioned in contact with a surface to be imaged by the camera and the imaging device is moved across the surface, the spacing member maintains a fixed distance between the camera and the surface as the imaging device moves across the surface to be imaged,
   wherein the spacing member includes a hollow truncated cone comprising a body portion engagement end and a surface contact end, the body portion engagement end of the hollow truncated cone engages the imaging end of the body portion and the surface contact end of the hollow truncated cone is configured to be in contact with the surface to be imaged by the camera, and the camera is configured to face toward the surface contact end of the hollow truncated cone.

2. The imaging device of claim 1, wherein the hollow truncated cone is transparent or translucent, and the camera is disposed within an interior of the hollow truncated cone.

3. The imaging device of claim 1, wherein:
   when the hollow truncated cone is positioned in contact with the surface to be imaged, the surface contact end contacts the surface; and
   the surface contact end is open such that the hollow truncated cone does not obstruct the camera when the camera images the surface.

4. The imaging device of claim 1, wherein the camera has an optical axis that extends in the lengthwise direction.

5. The imaging device of claim 1, wherein the body portion is a cylindrical body portion having a maximum diameter of less than three inches.

6. The imaging device of claim 1, wherein the body portion is pen-shaped such that a length of the body portion is at least three times greater than a maximum cross-sectional width of the body portion.

7. The imaging device of claim 1, further comprising:
   a processor communicatively coupled to the camera;
   a memory module communicatively coupled to the processor; and
   machine readable instructions stored in the memory module that cause the imaging device to perform at least the following when executed by the processor:

receive image data from the camera;
recognize text included in the received image data; and
provide output indicative of the recognized text.

8. The imaging device of claim 7, further comprising a speaker communicatively coupled to the processor, wherein the machine readable instructions, when executed by the processor, cause the speaker to provide audible output indicative of the recognized text.

9. The imaging device of claim 7, further comprising network interface hardware communicatively coupled to the processor, wherein the machine readable instructions, when executed by the processor, cause the network interface hardware to transmit the output indicative of the recognized text to a portable electronic device.

10. The imaging device of claim 1, further comprising:
a processor communicatively coupled to the camera;
a memory module communicatively coupled to the processor; and
machine readable instructions stored in the memory module that cause the imaging device to perform at least the following when executed by the processor:
receive image data from the camera;
recognize an object included in the received image data; and
provide output indicative of the recognized object.

11. The imaging device of claim 1, further comprising:
a processor communicatively coupled to the camera;
a tactile feedback device communicatively coupled to the processor;
a memory module communicatively coupled to the processor; and
machine readable instructions stored in the memory module that cause the imaging device to perform at least the following when executed by the processor:
receive image data from the camera; and
activate the tactile feedback device in response to the received image data.

12. The imaging device of claim 11, wherein the machine readable instructions, when executed by the processor, cause the imaging device to activate the tactile feedback device when the image data is determined to include text.

13. The imaging device of claim 1, further comprising:
a processor communicatively coupled to the camera;
tactile input hardware disposed on the body portion and communicatively coupled to the processor, wherein the tactile input hardware includes a touch strip;
a memory module communicatively coupled to the processor; and
machine readable instructions stored in the memory module that cause the imaging device to perform at least the following when executed by the processor:
receive a signal from the touch strip indicative of a user applying pressure to the touch strip;
receive image data from the camera;
recognize text or an object included in the received image data; and
provide output indicative of the recognized text or the recognized object in response to the signal received from the touch strip.

14. The imaging device of claim 1, further comprising:
a processor communicatively coupled to the camera;
an inertial measurement unit communicatively coupled to the processor;
a memory module communicatively coupled to the processor; and
machine readable instructions stored in the memory module that cause the imaging device to perform at least the following when executed by the processor:
detect an orientation of the imaging device with the inertial measurement unit; and
determine an operating mode for the imaging device based on the detected orientation.

15. An imaging device comprising:
a body portion extending in a lengthwise direction from a distal end of the body portion to an imaging end of the body portion;
a spacing member extending from the imaging end of the body portion in the lengthwise direction; and
a camera coupled to the imaging end of the body portion, wherein when the spacing member is positioned in contact with a surface to be imaged by the camera and the imaging device is moved across the surface, the spacing member maintains a fixed distance between the camera and the surface as the imaging device moves across the surface to be imaged,
wherein the spacing member includes a hollow truncated cone comprising a body portion engagement end and an open surface contact end, the body portion engagement end of the hollow truncated cone engages the imaging end of the body portion and the open surface contact end of the hollow truncated cone is configured to be in contact with the surface to be imaged by the camera is configured to face toward the open surface contact end of the hollow truncated cone.

16. The imaging device of claim 15, wherein the hollow truncated cone is transparent or translucent, and the camera is disposed within an interior of the hollow truncated cone.

17. The imaging device of claim 15, further comprising:
a processor communicatively coupled to the camera;
a tactile feedback device communicatively coupled to the processor;
a memory module communicatively coupled to the processor; and
machine readable instructions stored in the memory module that cause the imaging device to perform at least the following when executed by the processor:
receive image data from the camera; and
activate the tactile feedback device in response to the received image data.

18. An imaging device comprising:
a body portion;
a camera coupled to the body portion,
a processor communicatively coupled to the camera;
a tactile feedback device coupled to the body portion of the imaging device and communicatively coupled to the processor of the imaging device;
a memory module communicatively coupled to the processor; and
machine readable instructions stored in the memory module that cause the imaging device to perform at least the following when executed by the processor:
receive image data from the camera; and
activate the tactile feedback device in response to text being recognized in the image data received from the camera.

19. The imaging device of claim 18, further comprising a spacing member extending from an imaging end of the body portion in a lengthwise direction, wherein when the spacing member of the imaging device is positioned in contact with a surface to be imaged by the camera and the imaging device is moved across the surface, the spacing member maintains a fixed distance between the camera and the surface as the imaging device moves across the surface to be image.

20. The imaging device of claim 19, wherein, the spacing member is a hollow truncated cone, the hollow truncated cone is transparent or translucent, and the camera is disposed within an interior of the hollow truncated cone.

* * * * *